United States Patent [19]
Kohno

[11] Patent Number: 4,989,925
[45] Date of Patent: Feb. 5, 1991

[54] BRAKE PRESSURE CONTROL DEVICE FOR VEHICLES

[75] Inventor: Teruhisa Kohno, Itami, Japan

[73] Assignee: Sumitomo Electric Industries, Ltd., Osaka, Japan

[21] Appl. No.: 346,274

[22] Filed: Apr. 28, 1989

Related U.S. Application Data

[63] Continuation of Ser. No. 90,589, Aug. 28, 1987, abandoned.

Foreign Application Priority Data

Sep. 4, 1986 [JP] Japan .................. 61-209039

[51] Int. Cl.⁵ ............................... B60T 1/08
[52] U.S. Cl. .................. 303/116; 303/119; 60/566
[58] Field of Search .......... 60/535, 545, 565–566, 60/582, 591, 413; 303/116, 119

[56] References Cited

U.S. PATENT DOCUMENTS

| | | | |
|---|---|---|---|
| 1,885,580 | 11/1932 | Bradbury | 60/582 X |
| 2,476,089 | 7/1949 | Gunderson | 60/566 |
| 4,193,264 | 3/1980 | Takahashi et al. | 60/413 X |
| 4,597,611 | 7/1986 | Nishimura et al. | 303/116 |
| 4,602,824 | 7/1986 | Nishimura et al. | 303/116 X |
| 4,693,521 | 9/1987 | Takata et al. | 60/566 X |
| 4,723,575 | 2/1988 | Kazita et al. | 60/591 X |
| 4,753,490 | 6/1988 | Belart et al. | 60/591 X |
| 4,755,008 | 7/1988 | Imoto et al. | 303/116 X |
| 4,812,777 | 3/1989 | Shirai | 60/565 X |
| 4,824,181 | 4/1989 | Tomala | 60/565 X |

FOREIGN PATENT DOCUMENTS

| | | |
|---|---|---|
| 3124755 | 1/1983 | Fed. Rep. of Germany . |
| 3131856 | 2/1983 | Fed. Rep. of Germany ...... 303/119 |
| 3785 | 1/1985 | Japan . |
| 2084676 | 4/1982 | United Kingdom .................. 60/566 |

*Primary Examiner*—Edward K. Look
*Assistant Examiner*—George Kapsalas
*Attorney, Agent, or Firm*—W. G. Fasse; D. H. Kane, Jr.

[57] ABSTRACT

A brake pressure control device introduces pump pressure which is produced by a pump (16) into piping which connects a master cylinder (4) and wheel brakes (11, 11', 12, 12'). The increase, decrease and retention of the wheel brake pressure are effected by utilizing the pump pressure. Absorbers (19, 19') which consume hydraulic fluid are installed in branches from piping which connects the master cylinder (4) and the wheel brakes (11, 11', 12, 12'). 4-port 2-position control valves (5, 5') are installed in the hydraulic passages which connect the master cylinder (4) and the absorbers (19, 19') and at the inlet port for the pump pressure and at the outlet port to the absorbers (19, 19'). The 4-port 2-position control valves (5, 5') selectively switch the hydraulic passages in such a manner that when the pump pressure is normal, they render conductive the hydraulic passage which connects the master cylinder (4) and absorbers (19, 19') but when the pump pressure fails and thereby decreases, they render conductive the hydraulic passage which connects the master cylinder (4) and wheel brakes (11, 11', 12, 12').

6 Claims, 3 Drawing Sheets

BRAKE PRESSURE CONTROL DEVICE FOR VEHICLES

This application is a continuation, of application Ser. No. 07/090,589, filed Aug. 28, 1987, now abandoned.

FIELD OF THE INVENTION

This invention relates to a brake pressure control device for vehicles and particularly to such a device wherein a pump pressure is introduced into piping which connects a master cylinder and a wheel brake, said pump pressure being utilized for the increase, decrease or retention of the wheel brake pressure.

DESCRIPTION OF THE PRIOR ART

Heretofore, various brake power controls, such as vehicle brake power multiplication action, control power distribution, anti-lock control, traction control on driving wheels, stop retention, vehicle-to-vehicle distance control and obstacle avoidance as effected by automatic brakes, have been performed by controlling the brake working hydraulic pressure by individual devices or individual systems including electronic control devices. However, such brake power controls can be effected by a combination of three states, i.e., increase, decrease and retention of the brake working hydraulic pressure during both brake operation and non-operation. If the brake power controls described above are effected by individual devices or systems, some structural components will overlap each other, bringing about many problems including economic loss, decrease of reliability, decrease of space for mounting in vehicles and increase of vehicle weight. Therefore, coordination of brake power control devices is desired.

The simplest means for effecting the increase, decrease and retention of the wheel brake pressure would be to provide a shut-off valve directly in the pipe conduit connects the master cylinder and the wheel brake and to introduce pump pressure between the shut-off valve and the wheel brake. For improving the cost/performance ratio, a system is known wherein the shut-off valve is closed at all times rather than only in emergencies, for example, when an anti-lock or traction control is needed, so that also during normal brake operation the pump pressure adds to the wheel brake by an amount corresponding to the brake operation input to thereby enable a brake multiplication action and for distributing the brake power effectively. This system is proposed in West German Pat No. 3,124,755. In the known system, if the pump pressure fails, the wheel brake should be pressurized directly by the master cylinder without closing the shut-off valve.

The known system of German Pat. No. 3,124,755 however, has a drawback that the pedal assumes a very stiff state because there is no communication between the master cylinder and the wheel brake, when the shut-off valve is closed. To prevent this, in said known device, as schematically shown in FIG. 4, an absorber which takes up hydraulic fluid is installed between the master cylinder and the shut-off valve to mitigate the very stiff feeling when operating the pedal. However, if the pump pressure fails, it is necessary to pressurize the wheel brake as well as to feed hydraulic fluid to the absorber, resulting in an increase in the pedal stroke. Thus, the system of German Pat. No. 3,124,755 has the drawback that the pedal feeling is not as it should be.

As to another method of avoiding the very stiff feeling, the same applicant as in this application has proposed in Japanese Pat. application No. 3,758,1985 a system comprising spring means installed between the brake pedal and the master cylinder, the resilient force of said spring means being used to mitigate the very stiff feeling, the arrangement being such that when the pump pressure fails, said spring means is retracted to a position where it does not influence an effort to operate the pedal, so as to maintain the pedal feeling unchanged. With this system, however, not only does the construction become complicated, but also it is necessary to lead the pump pressure to the position of the master cylinder, resulting in an increase in piping cost and a decrease in reliability.

SUMMARY OF THE INVENTION

Accordingly, the invention is intended to solve the aforesaid problems inherent in the prior art by simple means and has for its object the provision of a brake pressure control device for vehicles which avoids the very stiff pedal feeling on the brake pedal and makes it possible to obtain the same pedal stamp feeling also when the pump pressure fails.

FIG. 1 shows the basic concept of the invention comprising a brake pressure control device for vehicles which introduces pump pressure into piping or first fluid conduits which connect a master cylinder and a wheel brake, said pump pressure being utilized to effect the increase, decrease and retention of the wheel brake pressure. An absorber which takes up hydraulic fluid is installed in a branch leading away from the piping which connects the master cylinder and the wheel brake. Further, switching means is provided which selectively switches the hydraulic passages in such a manner that when the pump pressure is normal, it renders conductive the hydraulic passage which connects the master cylinder and absorber but when the pump pressure fails and thereby decreases, it renders conductive the hydraulic passage which connects the master cylinder and wheel brake.

The amount of hydraulic fluid to be taken up consumed by the absorber can be determined as desired. Thus, it is possible to determine this amount of hydraulic fluid such that it approximates the wheel brake pressure. Further, when the pump pressure fails, the switching means shuts off the hydraulic passage which connects the master cylinder and absorber while rendering conductive the hydraulic passage which connects the master cylinder and wheel brake. Therefore, during normal brake operation and also during pump pressure failure, the same pedal feeling can be obtained. Further, any desired feeling setting for failure warning can be freely made.

As described above, according to the invention, an absorber is installed in a branch leading away from the piping which connects the master cylinder and wheel brake, and switching means which selectively renders conductive the hydraulic passage which connects the master cylinder and absorber or the hydraulic passage which connects the master cylinder and wheel brake is installed. Therefore, it is possible to avoid the very stiff feeling on the brake pedal which has heretofore been a problem and to obtain substantially the same pedal feeling when the pump pressure is normal and also when the pump pressure fails.

These objects and other objects, features, aspects and advantages of the present invention will become more
} apparent from the following detailed description of the present invention when taken in conjunction with the accompanying drawings.

DESCRIPTION OF THE PREFERRED EMBODIMENTS AND OF THE BEST MODE OF THE INVENTION

Figure 1:
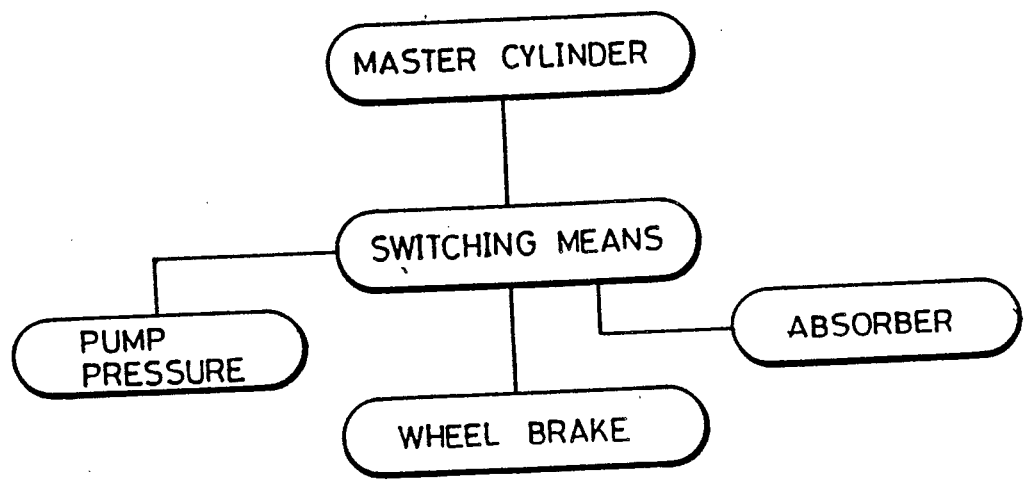
FIG. 1 is a diagram showing the basic concept of the invention.
Figure 4:
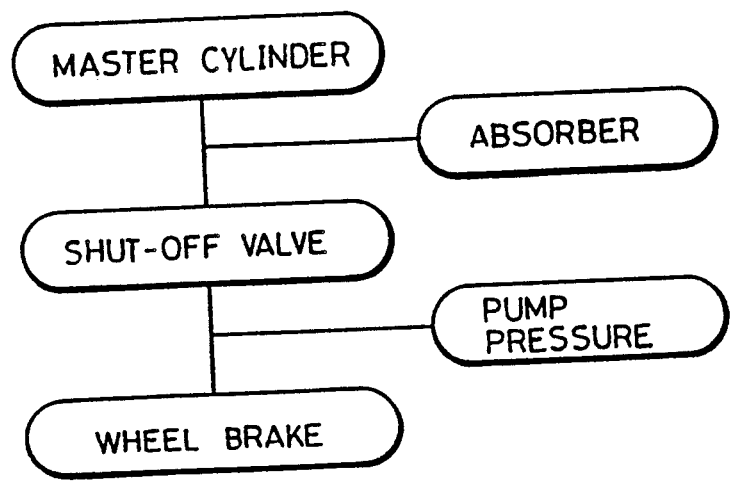
FIG. 4 is a diagram showing the basic concept of an example of a conventional brake pressure control device.
Figure 2:
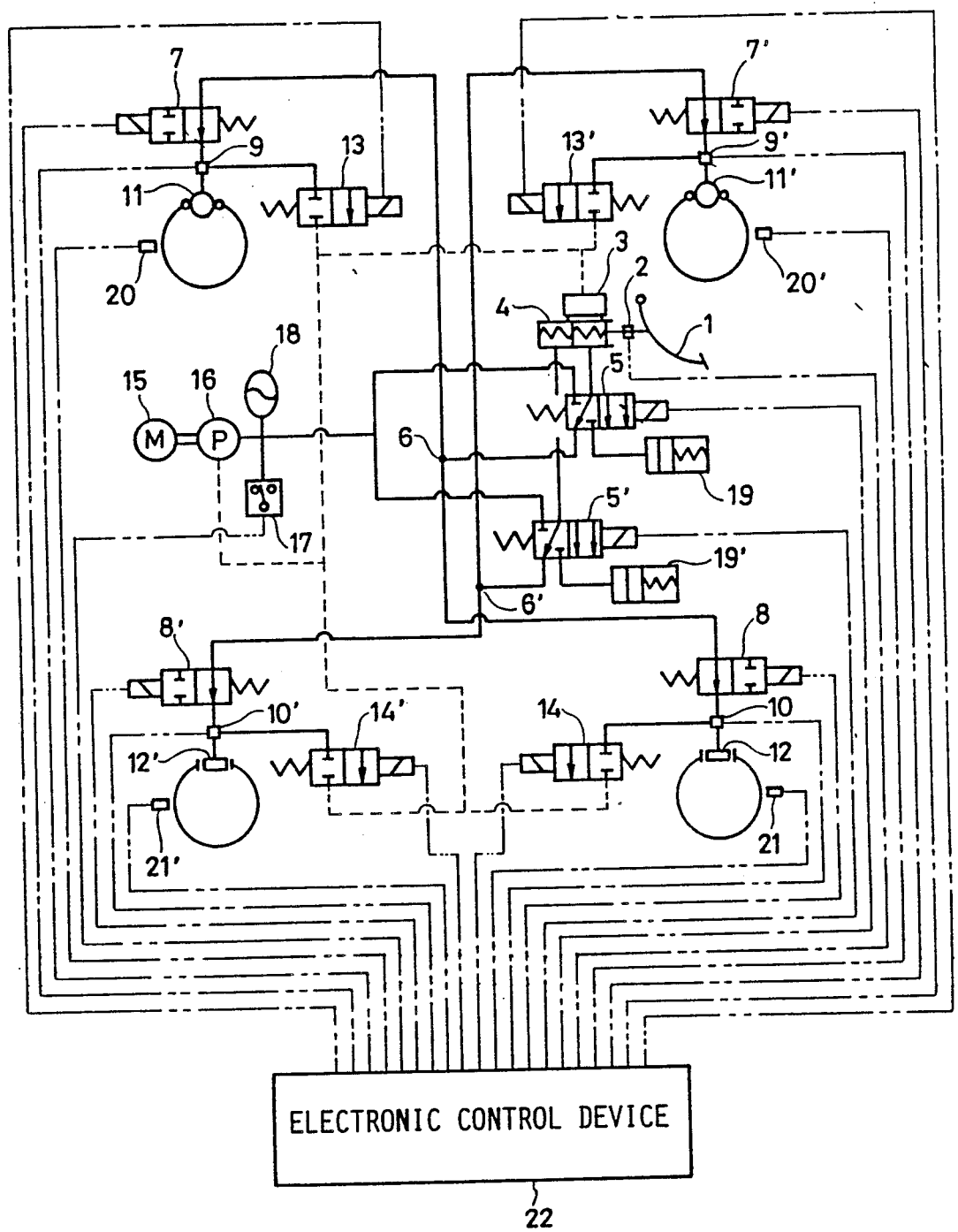
FIG. 2 is a hydraulic circuit diagram showing an embodiment of the invention applied to diagonal split piping.

FIG. 2 shows a hydraulic circuit showing an embodiment of the invention applied to diagonal split piping.

In FIG. 2, if a brake pedal 1 is operated, the hydraulic fluid in a master cylinder 4 having a reserve tank 3 is pressurized through a push rod having a pedal effort sensor 2. The hydraulic pressure thus produced in the master cylinder 4 passes through first fluid conduit means and through 4-port 2-position control valves 5 and 5' and branches at branch points 6 and 6' to flow into front and rear brakes. The branch pressures pass through shut-off valves 7, 7', 8 and 8' constructed as 2-port 2-position control valves and pressure sensors 9, 9', 10 and 10' into wheel brakes 11, 11', 12 and 12'. Further, it is arranged that the hydraulic brake fluid between the shut-off valves 7, 7', 8, 8' and the wheel brakes 11, 11', 12, 12' returns to the reserve tank 3 through discharge valves 13, 13', 14 and 14' constructed as 2-port 2-position control valves.

On the other hand, pump pressure is introduced into the piping which connects the master cylinder 4 and wheel brakes 11, 11', 12 and 12' through second fluid conduits. More particularly, the pressure produced by a pump 16 which is driven by an electric motor 15 and draws the hydraulic brake fluid from the reserve tank 3 and pressurizes it, is maintained in a fixed range by a pressure switch 17 and is stored in an accumulator 18. This pressure is also led to the 4-port 2-position control valves 5 and 5'.

As shown, absorbers 19 and 19' which take up hydraulic fluid are connected to the 4-port 2-position control valves 5 and 5'. The wheels have wheel speed sensors 20, 20', 21 and 21', respectively. Information from the wheel speed sensors 20, 20', 21 and 21', like information from the pedal effort sensor 2 and the pressure sensors 9, 9', 10, 10', is led to an electronic control device 22.

The state shown in FIG. 2 is one which is assumed when the brake is not operated. In this case, the 4-port 2-position control valves 5 and 5', as shown, render conductive the hydraulic passage which connects the master cylinder 4 and wheel brakes 11, 11', 12 and 12' and shut off the hydraulic passage which connects the master cylinder 4 and absorbers 19 and 19'.

In this state, if the brake pedal 1 is operated, the start of brake operation is detected by the pedal effort force sensor 2 and the 4-port 2-position control valves 5 and 5' are switched to the second position. In this case, the hydraulic passage which connects the master cylinder 4 and wheel brakes 11, 11', 12 and 12' is shut off, while the hydraulic passage which connects the master cylinder 4 and absorbers 19 and 19' is rendered conductive. Therefore, the master cylinder 4 pressurizes the absorbers 19 and 19' only. Further, the pump pressure is introduced through the second fluid conduits into the hydraulic passage of the first fluid conduits leading to the wheel brakes 11, 11', 12 and 12'. This pump pressure is controlled by suitably switching the inlet valves 7, 7', 8 and 8' and the discharge valves 13, 13', 14 and 14' while comparing the brake operation input which is detected by the pedal effort sensor 2 with the brake pressure which is detected by the pressure sensors 9, 9', 10 and 10'. In this way, a wheel brake having the added feature of a brake power multiplication action can be made. Further, by making use of the information from the wheel sensors 20, 20', 21 and 21', the so-called brake effectiveness control intended to maintain constant the relationship between vehicle deceleration and pedal effort, brake power distribution, anti-lock control, etc. can be effected to a great degree.

Also, when the brake is not operated, the wheel brake 11, 11', 12 and 12' can be optionally pressurized, when necessary, by suitably switching the 4-port 2-position control valves 5, 5', inlet valves 7, 7', 8 and 8' and discharge valves 13, 13', 14 and 14'. Therefore, an automatic brake operation for an obstacle avoidance and vehicle-to-vehicle distance, control, and traction control on driving wheels and stop retention, can be achieved by the addition of other sensors.

The pedal feeling during brake operation can be optionally determined by suitably selecting the amount of hydraulic fluid to be taken up by the absorbers 19 and 19'. Further, during failure of the power system, this state is detected by the pressure switch 17. Thus, by retaining the 4-port 2-position control valves 5 and 5' in the position shown in FIG. 2, it is possible to pressurize the wheel brakes 11, 11', 12 and 12' directly by the hydraulic pressure produced by the master cylinder 4.

Figure 3:
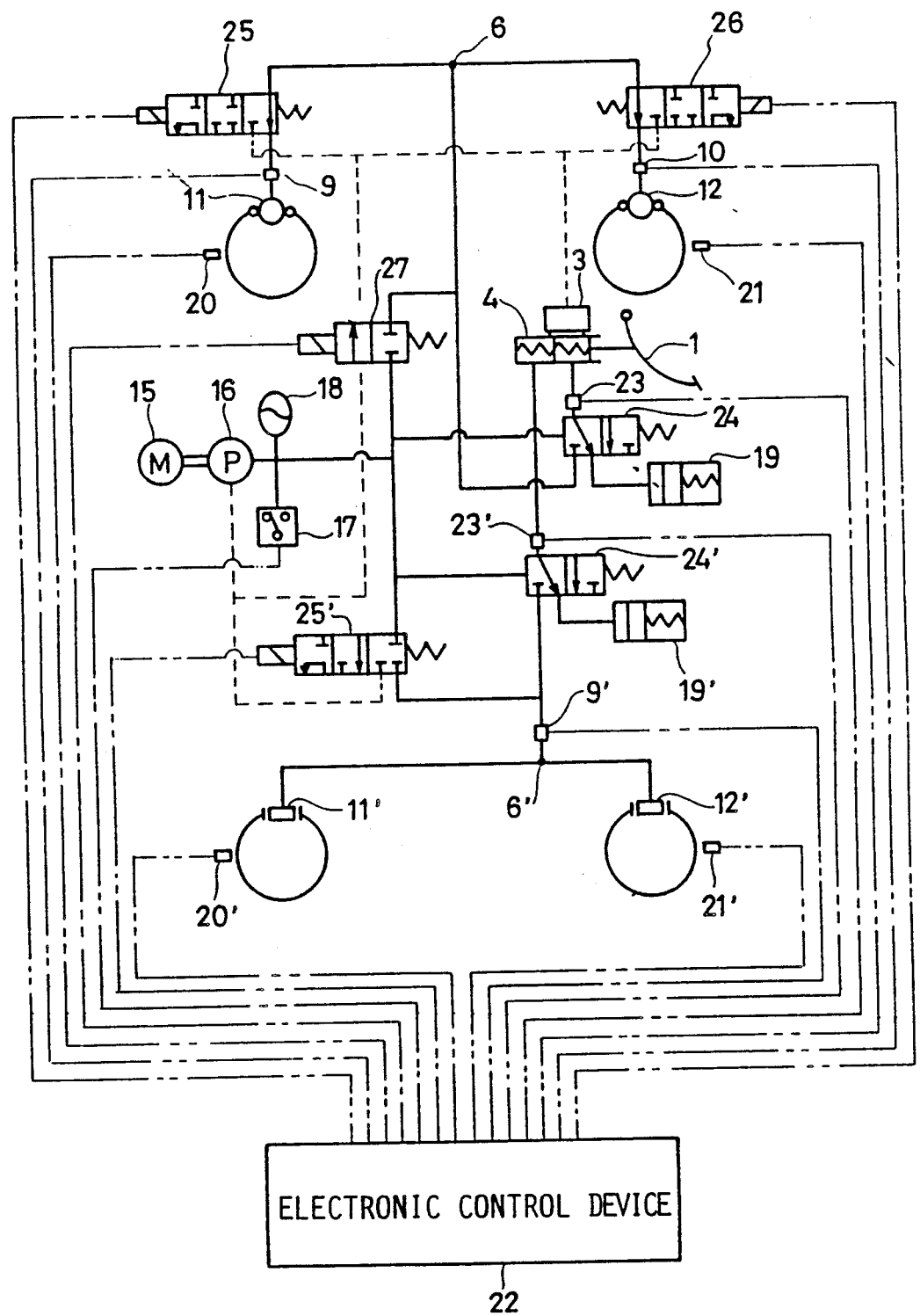
FIG. 3 is a hydraulic circuit diagram showing an embodiment of the invention applied to front-and-rear split piping.

Referring to showing FIG. 3 a hydraulic pressure circuit of another embodiment of the invention as applied to front-and-rear split piping, a brake operation input produced by the brake pedal 1 is detected by the pressure sensors 23 and 23' as a pressure produced by the master cylinder 4. As shown, there are 3-port 2-position pressure-sensitive switching valves 24 and 24' forming switchable first valve means which use the pump pressure from the pump 16 as a control input. The pressure-responsive switching valves 24, 24' operate in such a manner that when the pump pressure is less than a fixed value, the pressure-responsive switching valves 24 and 24' allow the master cylinder 4 to directly pressurize the wheel brakes 11, 11', 12 and 12' and that when the pump pressure is normal, they allow the master cylinder 4 to pressurize the absorbers 19 and 19' only.

As shown in FIG. 3, there are 3-port 3-position control valves 25 and 26 provided by combining the shut-off and discharge valves associated with the front wheels. There is an inlet valve 27 in the form of a 2-port 2-position control valve for introducing the pump pressure into the brake system associated with the front wheels. In FIG. 3 the valves 25 and 27 form switchable second valve means which are separate from the switchable first valve means 24, 24' in FIG. 3. Only one pressure sensor 9' for the rear wheels is provided at a point a little short of the branch point 6' leading to the right and left wheel brakes. Thus, there is no need for providing a shut-off valve for each of the right and left wheels; only one 3-port 3-position control valve 25' which is a combination of an inlet valve and a discharge valve is provided. Therefore, when the pump pressure is above a fixed value, state shown in FIG. 3 is established. And the front brakes 11 and 12 can be independently controlled by switching the 3-port 2-position control valves 26 and 25' and the inlet valve 27, and under the same pressure the rear wheel brakes 11' and 12' can be respective desired pressures. Furthermore, since any desired pedal feeling can be obtained, various brake power controls are possible as in the embodiment shown in FIG. 2.

When the pump pressure is less than the fixed value, the pressure-responsive switching first valves 24 and 24' are switched to render conductive the hydraulic passage which connects the, master cylinder 4 and the wheel brakes 11, 12, 11' and 12'. Therefore, it is possible to apply to the wheel brakes, the hydraulic pressure from the master cylinder 4.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A brake pressure control system for vehicle brakes, comprising brake means for braking vehicle wheels, master cylinder means driven by a pedal force for operating said brake means, first fluid conduit means for connecting said master cylinder means to said brake means, pump means for generating a pump pressure to operate said brake means, absorber means for taking up fluid, switchable first valve means having at least three ports and at least two positions, said switchable first valve means being operatively inserted in said first fluid conduit means, said at least three ports having a first port connected with said master cylinder means, a second port connected with said brake means, and a third port connected with said absorber means, said switchable first valve means communicating selectively said first port with said second port in one of said at least two positions and said first port with said third port in the other of said at least two positions when said switchable first valve means are operated; second fluid conduit means connecting said pump means to said first fluid conduit means through said switchable first valve means, whereby said second fluid conduit means are connectable to said brake means through said first fluid conduit means, switchable second valve means having at least two ports and at least first and second valve positions, said switchable second valve means being operatively connected in said second fluid conduit means, said switchable second valve means permitting in said first valve position pump pressure to enter into said first fluid conduit means, said switchable second valve means prohibiting in said second valve position pump pressure from passing through said switchable second valve means, adjusting means operatively inserted in said first fluid conduit means for adjusting the pump pressure to be applied to said brake means, input force detecting means positioned for detecting a force applied by an operator to said master cylinder means, pump pressure detecting means for detecting the pump pressure generated by said pump means, speed detecting means for detecting the speed of a vehicle wheel, and electronic control means connected for outputting driving signals for operating said switchable first, and second valve means and said adjusting means in response to signals detected by said input force detecting means, by said pump pressure detecting means, and by said speed detecting means.

2. The brake pressure control system of claim 1, wherein said switchable first and second valve means are solenoid operated valves.

3. The brake pressure control system of claim 1, wherein said switchable first valve means comprises a pressure-responsive switching valve connected for responding to said pump pressure as a control input and for responding to a variation in said pump pressure.

4. The brake pressure control system of claim 1, wherein said switchable first and second valve means are constructed as solenoid operated valves, and wherein said switchable second valve means have a first port connected with said master cylinder means, a second port connected with said brake means, a third port connected with said absorber means, said switchable first and second valve means further having each a fourth port connected with said pump means, said switchable first and second valve means being switchable by an electromagnetic force between a first valve position to communicate the first pot with the second port and isolate the third and fourth ports, and a second valve position to communicate the first port with the third port and communicate the second port with the fourth port.

5. The brake pressure control system of claim 1, wherein said switchable first and second valve means comprise four-port two-position valve means.

6. The brake pressure control system of claim 1, wherein said switchable first and second valve means comprise separate valve housings.

* * * * *

UNITED STATES PATENT AND TRADEMARK OFFICE
CERTIFICATE OF CORRECTION

PATENT NO. : 4,989,925

DATED : February 5, 1991

INVENTOR(S) : Teruhisa Kohno

It is certified that error appears in the above-identified patent and that said Letters Patent is hereby corrected as shown below:

Column 6, line 17, delete ",";
Column 6, line 41, replace "pot" by --port--;

Signed and Sealed this

Thirtieth Day of June, 1992

Attest:

DOUGLAS B. COMER

Attesting Officer

Acting Commissioner of Patents and Trademarks